UNITED STATES PATENT OFFICE.

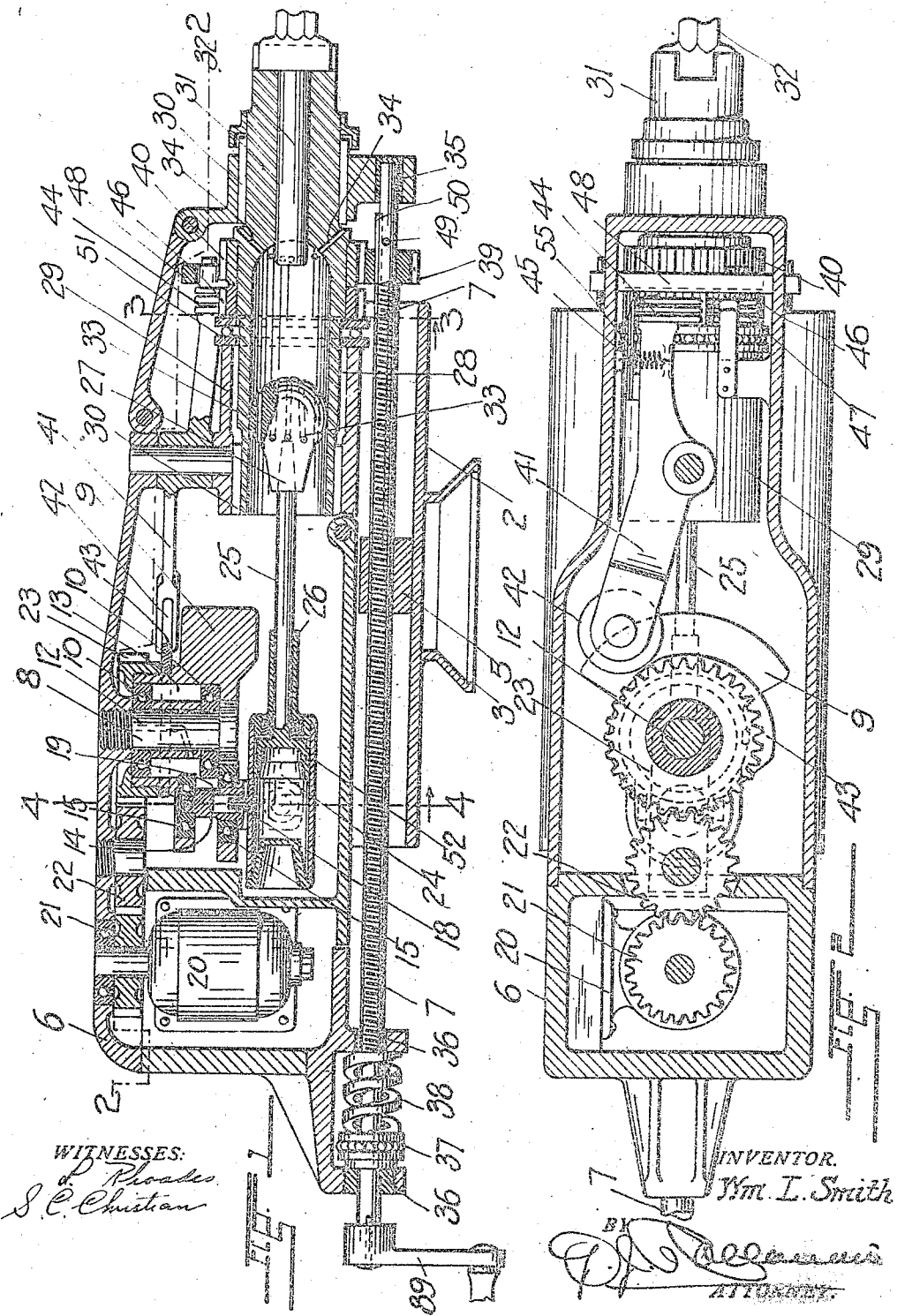

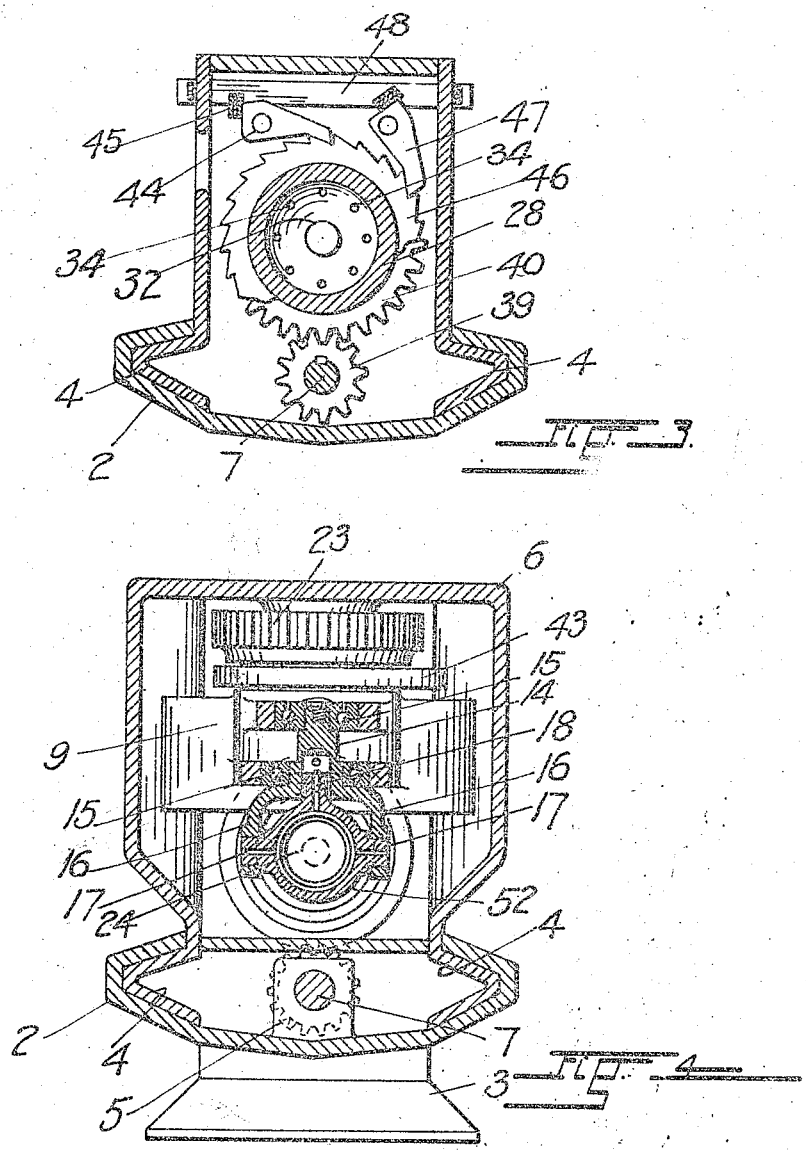

WILLIAM L. SMITH, OF CHICAGO, ILLINOIS.

ROCK-DRILL.

1,139,139.

Specification of Letters Patent. Patented May 11, 1915.

Application filed October 2, 1912. Serial No. 723,567.

*To all whom it may concern:*

Be it known that I, WILLIAM L. SMITH, a citizen of the United States, residing at Chicago, in the county of Cook and State of Illinois, have invented certain new and useful Improvements in Rock-Drills, of which the following is a specification.

My invention relates to rock drills and similar devices having reciprocatory elements, and more particularly to hammer drills of the type shown and described in my application for Patent No. 588,961, filed in the United States Patent Office October 25, 1910. A drill of the type above referred to comprises, essentially, a rotary crank wheel and a reciprocating hammer which is operatively connected therewith through the instrumentality of a cylinder which is secured to the wrist of the wheel and a piston which has a reciprocating movement in the cylinder and whose rod is rigidly connected with the hammer. The latter is guided in a circular surface with which it is in linear contact and it impinges during its forward stroke upon the cutting tool which is longitudinally movably supported in axial alinement with said surface.

The principal objects of the present invention reside 1st, in the provision of a wrist connection between the crank wheel and the cylinder which permits a self-adjustment of the latter about an axis transverse to that about which it rotates during its circular motion with the wheel, thereby assuring the proper operation of the machine even though the operating parts thereof are by wear or imperfect connections, placed out of alinement. 2nd, in mounting the element which provides the cylindrical guiding surface so that it may rotate about its longitudinal axis whereby to equalize the wear of said surface by the sliding and gravitative action of the reciprocating hammer. 3rd, in forming the element which provides the guiding surface integral with the chuck in which the cutting tool is longitudinally movably supported, so that the two parts may rotate in unison. 4th, in providing a mechanism whereby the said element may be rotated either by hand or by the rotary motion of the crank wheel; 5th, in associating with the said mechanism, means for feeding the drill housing to advance the cutting tool into the bore produced thereby, and 6th, in providing an oiling system by which a lubricant is continuously supplied to the frictionally engaging parts of the crank wheel, cylinder and piston.

An electric motor is mounted in the drill housing and is by a suitable transmission mechanism, connected with the crank wheel, thus rendering the machine entirely self-contained, and the drill housing is longitudinally slidably mounted upon a guide shell of the usual construction which is provided with means for securing it upon a column or other suitable support.

An embodiment of my invention has been illustrated in the accompanying drawings in the various views of which like parts are similarly designated and in which, Figure 1 represents a vertical section through my improved drill, Fig. 2, a horizontal section through the same taken along the line 2—2, Fig. 1, Fig. 3, a transverse section along the line 3—3 Fig. 1, and Fig. 4, a similar section taken along the line 4—4, Fig. 1.

Referring more specifically to the drawings, the reference character 2 designates the guide shell upon which the housing 6 of the machine is longitudinally movably mounted and which is provided with the usual standard 3 for its connection with a column or other suitable support. The shell has in its sides, parallel V-shaped guide grooves in which correspondingly shaped flanges 4 on the lower portion of the drill housing are slidably fitted, and a nut 5 secured in the shell intermediate of its extremities is provided for its connection with the guide screw 7 whose operative association with the drill housing will hereinafter be described. A vertical, headed stud-shaft 8 which at one of its ends is rigidly secured in a threaded opening in the upper portion of the housing, provides an axle for the support of a crank wheel 9, the rotary movement of which is rendered equable by the provision of a counter-poise opposite to the point at which the cushion cylinder 52 is connected with the same. A pair of ball bearings 10 applied between the shaft and the crank wheel are provided to reduce friction during the latter's rotary motion and an axial bore 12 in the shaft 8 connects with a chamber 13 within the crank wheel for the supply of a lubricant thereto from a source connected with the said bore at the outer end of the shaft. A wrist 14 which is rotatably mounted in ball bearings 15 on the crank wheel has exteriorly of the said wheel, a forked bearing 16 for the cushion cylinder 52. The latter is to this end provided with trunnions 17 which are rotatably fitted in bearings at the ends of the two members of the wrist-fork between which the cylinder is loosely disposed. An axially bored nipple 18 extending laterally from the cylinder, projects loosely into an axial recess in the body portion of the wrist 14 which is furthermore provided with a transverse passage 19 for the connection of said recess with a space around the wrist which communicates with the oil chamber of the crank wheel. The lubricant contained in the latter is thus continuously supplied to the interior of the cylinder as well as to the bearings of the wheel and the wrist.

The electric motor 20 which supplies the driving power for the machine is installed in a compartment at the rear end of the housing and a gear wheel 21 mounted on its armature shaft is through the instrumentality of an intermediate gear 22, operatively connected with a gear wheel 23 fixed on the crank wheel 9. A piston 24 which has a reciprocating movement in the cylinder 52 is formed integral with a rod 25 which is slidingly supported in an elongated bearing 26 formed on the cylinder-head which closes the forward end of the same, and a spherical impact hammer 27 detachably connected at the outer extremity of the rod is slidably fitted in a hollow guide cylinder 28 which is rotatably mounted in a cylindrical sleeve 29 at the forward end of the housing, upon bearings 30.

In the construction shown in the drawings the cylinder 28 is formed integral with a chuck 31 which protruding through an opening in the forward end of the housing has an axial bore in which the cutting tool 32 is longitudinally movably fitted. To avoid compression of the air in the guiding space of the cylinder 28 during forward movement of the hammer, the latter is provided with a plurality of longitudinal passages 33 and the said cylinder has for the same purpose a number of openings 34 which connect its interior at the forward end thereof with the surrounding atmosphere. It will be understood that if so desired either one of the series of passages may be eliminated.

The feed screw 7 hereinbefore referred to extends at its forward end into an opening in the housing which being closed at one of its ends, provides a thrust bearing 35 through which a longitudinal movement of the screw is transmitted to the housing 6. At its opposite, rearmost end the screw 7 is supported in bearings 36 on the housing between which a thrust bearing 37 and a coiled spring 38 are applied to render the contact between the end of the cutting tool and the breast of the hole produced thereby, resilient. A crank 89 is attached at the rear end of the feed screw for its rotation by hand and the rotary movement of the screw is transmitted to the cylinder 28 by means of a pinion 39 on the forward end of the screw and a therewith meshing gear wheel 40 secured around the cylinder. By rotation of the screw through the medium of the crank, the cylinder and the chuck may thus be rotated at the same time that the housing is moved forwardly to advance the cutting tool into the hole produced thereby or the same results may be obtained automatically by the rotary motion of the crank wheel through the instrumentality of a mechanism, the construction of which will now be explained. A lever 41 which has an oscillating movement about a vertical axis in bearings in the housing 6, carries at one of its ends an anti-friction roller 42 which engages the peripheral surface of a cam 43 which is keyed to the crank wheel 9. A set of pawls 44 mounted at the opposite end of the lever is, by means of a spring 45, held in yielding engagement with a ratchet wheel 46 fixed on the rotary cylinder 28 and another set of pawls 47 which likewise engage the teeth of the ratchet wheel, is provided to prevent retrograde motion of the same. A bar 48 extending transversely of the housing engages the upper surface of the lever 41 at the forward end of the same to guide it during its oscillatory movement in a horizontal plane and to thus prevent binding of its shaft in the bearings on the housing and a spring 55 is applied between a lug on the housing and the lever 41 to return the latter to its normal position after it has been moved about its fulcrum by the action of the cam 43 on the roller 42.

When it is desired to rotate the cylinder and feed the housing automatically, the pawls 44 on the lever are placed in engagement with the teeth on the ratchet wheel, while the other parts remain in the position they occupied for operating the cylinder by hand. During each revolution of the crank 9, the lever 41 oscillates about its axis and through the medium of the pawl and ratchet movement, imparts a partial rotation to the cylinder 28. The rotary movement of the latter is, by means of the gear wheel 40 and the pinion 39, transmitted to the feed screw 7 which in consequence imparts a longitudinal movement to the housing 6. In case it is desired to only rotate the cylinder automatically and feed the drill housing by hand, the pinion on the feed screw is moved out of engagement with the gear wheel 40 on the cylinder, which is readily accomplished by withdrawing the pin 49 which normally prevents its displacement on the screw and sliding the pinion along the feather 50 to a position at the opposite side of the said pin. A thrust bearing 51 applied between the cylinder 28 and the end of the sleeve 29 on the housing is provided to reduce friction when the machine is in operation.

In the operation of the drill, a combined circular and oscillating movement is imparted to the cylinder 52 through the rotary motion of the crank wheel and the compression of air in the said cylinder during a portion of its circular movement, provides a pneumatic spring which, during another portion of the said movement, drives the piston forward thereby causing the hammer 27 to forcibly engage the end of the cutting tool 22 whose shank projects into the interior of the guiding cylinder, and the compression of air alternately at opposite sides of the piston provides cushions which by absorption of the reactive forces relieve the parts of the machine of detrimental shocks.

While the preferred embodiment of my invention is in connection with its use for rock drills, it may be used for various other purposes in which a reciprocatory element is employed, and in the claims I do not intend to limit the scope of the invention to rock drills.

Having thus described my invention what I claim and desire to secure by Letters-Patent is:—

1. In an impact machine, a rotary crank, a cylinder having a wrist connection therewith, a piston in said cylinder, a hammer connected with said piston, and a tool disposed to be engaged by said hammer, said crank having a chamber in communication with the interior of said cylinder, for the supply of a lubricant thereto.

2. In an impact machine, a shaft having a passage for the supply of a lubricant, a crank on said shaft, having a chamber in communication with said passage, a wrist rotatable on said shaft and having a recess in communication with said chamber, a cylinder on said wrist, its interior being in communication with said recess, a piston in said cylinder, a hammer connected with said piston, and a tool disposed to be engaged by the said hammer.

3. In an impact machine, a rotary crank, a cylinder having a wrist connection therewith, a piston in said cylinder, a hammer connected with said piston, and a tool disposed to be engaged by said hammer, said crank, wrist-connection and cylinder having coöperative means for the supply of a lubricant to the interior of the cylinder during movement of the said crank.

4. In an impact machine, a rotary crank, a wrist rotatably mounted thereon and having a forked bearing, a trunnioned cylinder mounted in said bearing so as to be capable of movement for varying the angle between its longitudinal axis and the axis of rotation of the wrist, a piston in said cylinder, an impact-element connected with said piston, and means for guiding said element for rectilinear reciprocation.

5. In an impact machine, a support having a nut, a housing having bearings, a feed screw extending through said nut and rotatably mounted in said bearings, a bearing to resist end-thrust of said screw and a spring applied between said thrust bearing and one of the first mentioned bearings.

6. In an impact machine, a support, a housing movable thereon, an impact element, a rotary tool-holding chuck in said housing, capable of guiding said impact element for movement to engage a tool held in the chuck, means for converting a rotary movement of the chuck into a rectilinear movement of the housing on the support, for feeding the same toward the work engaged by the tool, and operating mechanism in said housing in operative connection with the impact element and the said rotary chuck.

7. In an impact-machine, a rotary crank, a wrist rotatably mounted thereon, a cylinder having a universal connection with said wrist, whereby it is capable of movement for varying the angle between its longitudinal axis and the axis of rotation of the wrist, a piston in said cylinder, an impact-element connected with said piston, and means for guiding said element for rectilinear reciprocation.

In testimony whereof I have affixed my signature in presence of two witnesses.

WILLIAM L. SMITH.

Witnesses:
HARRY J. CHENEY,
OSMUND ERICKSON.